United States Patent [19]

Gehrmann

[11] Patent Number: 4,920,868
[45] Date of Patent: May 1, 1990

[54] ELECTRICALLY OPERATED MACHINE FOR MAKING HOT BEVERAGES

[75] Inventor: Alfred Gehrmann, Solingen, Fed. Rep. of Germany

[73] Assignee: Robert Krups Stiftung & Co. KG., Solingen, Fed. Rep. of Germany

[21] Appl. No.: 239,139

[22] Filed: Aug. 31, 1988

[30] Foreign Application Priority Data

Sep. 11, 1987 [DE] Fed. Rep. of Germany ... 8712337[U]

[51] Int. Cl.⁵ .............................................. A47J 31/54
[52] U.S. Cl. ....................................... 99/279; 99/295; 285/347
[58] Field of Search ................ 99/279, 280, 281, 282, 99/283, 284, 285, 286, 288, 293, 295, 300, 302 R, 304, 323.1, 323.3; 285/302, 347; 426/433; 138/120

[56] References Cited

U.S. PATENT DOCUMENTS

| | | | |
|---|---|---|---|
| 3,594,021 | 7/1971 | Williams | 285/302 |
| 4,160,625 | 7/1979 | Sonderborg | 285/302 |
| 4,508,023 | 4/1985 | Naya | 99/279 |
| 4,546,697 | 10/1985 | Schaeffer | 99/279 |

Primary Examiner—Robert W. Jenkins
Attorney, Agent, or Firm—Peter K. Kontler

[57] ABSTRACT

An electrically operated coffee maker wherein the outlet of a water tank is separably connected with the lower end of a riser for hot water by a conduit which has an inlet fitting directly into the outlet of the tank and an outlet fitting directly into the lower end of the riser. A first O-ring is received in an external circumferential groove of the inlet and is surrounded and deformed by the outlet of the tank. A second O-ring is received in an external circumferential groove of the outlet and is surrounded and deformed by the lower end of the riser. The stream of water in the conduit is heated by one or more electric heating elements which can employ one or more thick film conductors.

20 Claims, 2 Drawing Sheets

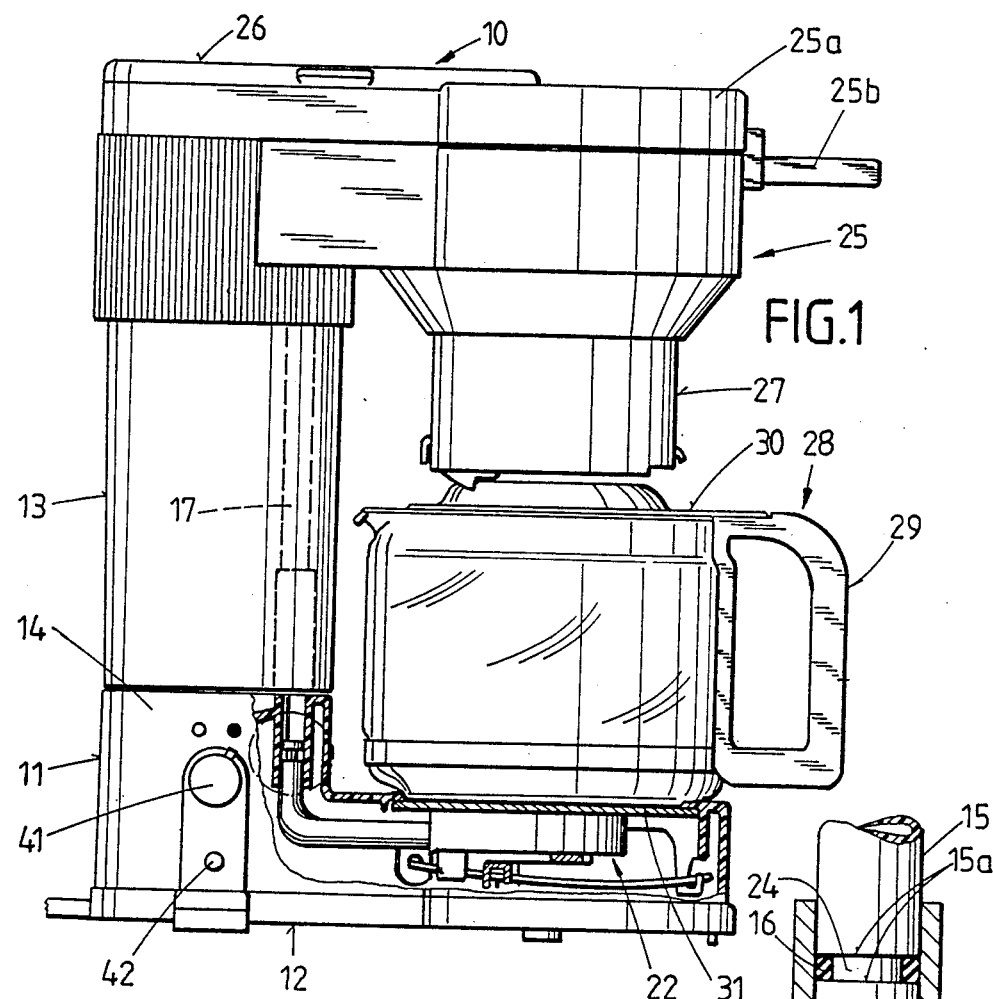
FIG.1
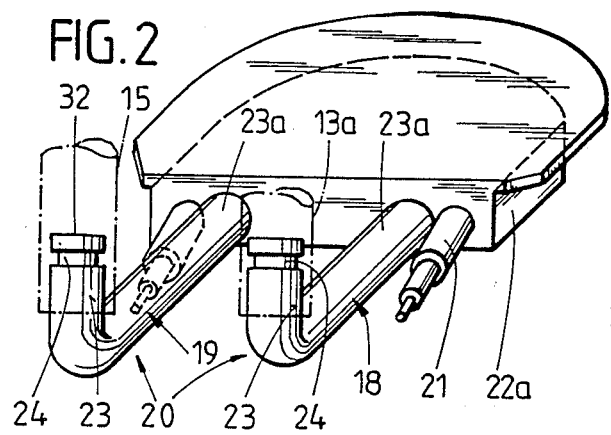
FIG.2
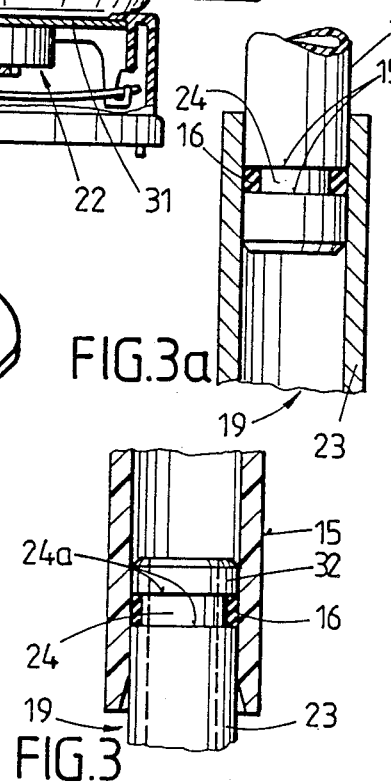
FIG.3a
FIG.3

4,920,868

ELECTRICALLY OPERATED MACHINE FOR MAKING HOT BEVERAGES

CROSS-REFERENCE TO RELATED CASE

Certain details of the machine of the present invention are similar to those of the machine which is disclosed in commonly owned copending patent application Ser. No. 207,764, filed June 16, 1988 by Erich Hoffmann for "Machine for making coffee and other hot beverages".

BACKGROUND OF THE INVENTION

The invention relates to improvements in machines for making hot beverages, such as coffee, tea or hot chocolate. More particularly, the invention relates to improvements in electrically operated machines for making hot beverages and to improvements in means for heating a liquid (such as water or milk) in such machines before the liquid is caused or permitted to contact an aromatic agent, e.g., comminuted coffee beans, tea leaves or chocolate powder. The invention will be described primarily in connection with coffee making machines; however, it is to be understood that the invention can be embodied with equal or similar advantage in tea making machines, in machines for making hot chocolate and/or in any other electrically operated machines which are designed to heat a liquid prior to causing or permitting the heated liquid to contact a flavoring agent.

A coffee making machine normally comprises a tank or another suitable source of water, a filter holder which can receive a supply of comminuted coffee (normally in a filter bag), a device for electrically heating water between the tank and the filter holder, and a warming plate or another suitable support for a pot or another vessel which is to receive hot beverage from the filter holder. Reference may be had, by way of example, to "Euro/Brew/Aroma" Coffee Maker No. 154 and to "Euro/Brew/Signal" Coffee Maker No. 152, both manufactured and distributed by the assignee of the present application.

The heating device in a conventional electric coffee maker normally comprises a bent (particularly U-shaped) water-conveying conduit which is in direct contact with one or more electric heating elements. Such heating element or elements can be provided on a bent (e.g., U-shaped) pipe which directly surrounds the conduit and is in large-area surface-to-surface contact therewith so as to ensure a satisfactory exchange of heat and predictable heating of water in the conduit to a desired temperature while the water flows from the tank toward and into a riser which conveys heated water into the filter holder wherein heated water is permitted to contact a supply of comminuted coffee beans. The inlet of the water-conveying conduit receives cold water from the tank and the outlet of the conduit delivers hot water into the lower end portion of the riser.

In presently known coffee making machines, the entire water-conveying conduit (inclusive of the inlet and outlet) is located in a substantially horizontal plane when the machine is set up for use, and the conduit is normally installed in the hollow base portion or leg of the housing of the coffee making machine. On the other hand, the tank is normally mounted in or on the housing in upright position, and the same applies for the riser which delivers hot water into the filter holder. Therefore, conventional coffee making machines must employ complicated elbow-shaped or similarly configurated discrete coupling devices which serve to connect the horizontal inlet of the conduit with an outlet of the water tank and to connect the horizontal outlet of the conduit with the lower end portion of the riser. As a rule, each coupling device has a first elastic end portion which is connectable with the outlet of the tank or with the lower end portion of the riser, and a second elastic end portion which is connectable with the inlet or outlet of the water-conveying conduit. Such coupling devices contribute significantly to the initial cost of the machine, not only because they are rather expensive but also because they cannot be readily assembled with water tanks, risers and water-conveying conduits in automatic machinery, e.g., in a production line.

OBJECTS OF THE INVENTION

An object of the invention is to simplify the electric heating means of a coffee making, tea making or like machine.

Another object of the invention is to provide a machine wherein the electric heating means can be automatically assembled with associated parts, such as a source of cold liquid and means for receiving heated liquid.

A further object of the invention is to provide novel and improved liquid-tight connections between the electric heating means and tubular elements which constitute component parts of liquid supplying and liquid receiving means in a coffee making or like machine.

An additional object of the invention is to provide electric liquid heating means which can be assembled with other parts of a coffee making or like machine in a production line at a fraction of the cost of assembling conventional machines.

Still another object of the invention is to provide a novel and improved method of establishing a path for the flow of a liquid medium from a source to a receiver for hot liquid in a coffee making, tea making or like machine.

A further object of the invention is to provide a novel and improved method of assembling the electric liquid heating means for use in a coffee making, tea making or like machine with those components of the machine which serve to supply cold liquid to and to receive heated liquid from the heating means.

SUMMARY OF THE INVENTION

One feature of the present invention resides in the provision of a machine for making hot beverages by contacting a heated liquid with a flavoring agent. The machine comprises a source of liquid which has an outlet for the liquid, a receptacle which serves for storage of a flavoring agent and has an inlet, means for heating the liquid including a conduit having an inlet communicating directly with the outlet of the source and an outlet which communicates directly with the inlet of the receptacle, a first sealing element which is interposed between the inlet of the conduit and the outlet of the source, and a second sealing element which is interposed between the outlet of the conduit and the inlet of the receptacle. The receptacle preferably includes a riser having a lower portion which includes or constitutes the inlet of the receptacle.

The inlet and the outlet of the conduit can respectively include first and second tubular coupling portions, the outlet of the source can include or constitute a third tubular coupling portion, and the inlet of the receptacle can include or constitute a fourth coupling portion. One of the first and third coupling portions can be directly telescoped into the other of these coupling portions (with the respective (first) coupling element disposed between the first and third coupling portions), and one of the second and fourth coupling portions can be directly telescoped into the other of the second and fourth coupling portions (with the respective (second) sealing element disposed between the second and fourth coupling portions). One of the first and third coupling portions can have a groove for the first sealing element, and one of the second and fourth coupling portions can have a groove for the second sealing element. Each of these grooves can constitute a circumferentially complete groove. In accordance with a presently preferred embodiment, the first and second coupling portions are telescoped into the third and fourth coupling portions, respectively.

The inlet of the conduit can include an additional tubular portion which is inclined relative to the first coupling portion, and the outlet of the conduit can have an additional tubular portion which is inclined relative to the second coupling portion. The additional portions and the respective coupling portions of the conduit can be disposed at right angles to each other.

The heating means can include an insulating carrier which is immediately or closely adjacent the conduit between the inlet and the outlet of the conduit, at least one thick film conductor on or in the carrier, electric switch means in circuit with the thick film conductor, and current regulating means (such current regulating means can include one or more relays) in circuit with the thick film conductor. The carrier can form part of or it may constitute a support for the conduit. The support serves to maintain, or has means for maintaining, the inlet and the outlet of the conduit at a predetermined distance from and in a predetermined orientation relative to each other. For example, the inlet and the outlet of the conduit can be parallel to each other and can be disposed in two vertical planes when the machine embodying the conduit is in actual use and rests on a table, counter top or the like.

The housing of the machine is preferably designed to maintain the outlet of the source and the inlet of the receptacle at a predetermined distance from and in a predetermined orientation relative to each other so that the inlet of the conduit can be inserted into or can receive the outlet of the source at the time the outlet of the conduit is inserted into or receives the inlet of the receptacle.

The first sealing element can surround the outlet of the source or the inlet of the conduit, and the second sealing element can surround the inlet of the receptacle or the outlet of the conduit.

Means can be provided to hold the first and/or the second sealing element in a predetermined position relative to the outlet of the source or inlet of the conduit (first sealing element) and relative to the inlet of the receptacle or relative to the outlet of the conduit (second sealing element). Such maintaining means can include suitable shoulders, projections, grooves and/or other means for ensuring that the sealing elements will be held in proper positions during coupling of the inlet and outlet of the conduit to the outlet of the source and to the inlet of the receptacle.

Another feature of the invention resides in the provision of a method of conveying water or another liquid from a source to a receptacle in a machine for making hot beverages wherein the liquid is caused to contact a flavoring agent in the receptacle. The method comprises the steps of establishing a path for the flow of liquid from the source to the receptacle including directly and sealingly connecting one end of an elongated conduit with the source and directly and sealingly connecting the other end of the conduit with the receptacle, and electrically heating the liquid in the conduit between the one end and the other end of the conduit.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic partly elevational and partly vertical sectional view of a coffee making machine which embodies one form of the invention;

FIG. 2 is a perspective view of the heating means in the machine of FIG. 1;

FIG. 3 is an enlarged view of a detail within the phantom-line circle III in FIG. 1;

FIG. 3a shows a modification of the structure which is shown in FIG. 3; and

DESCRIPTION OF PREFERRED EMBODIMENTS

Figure 4:
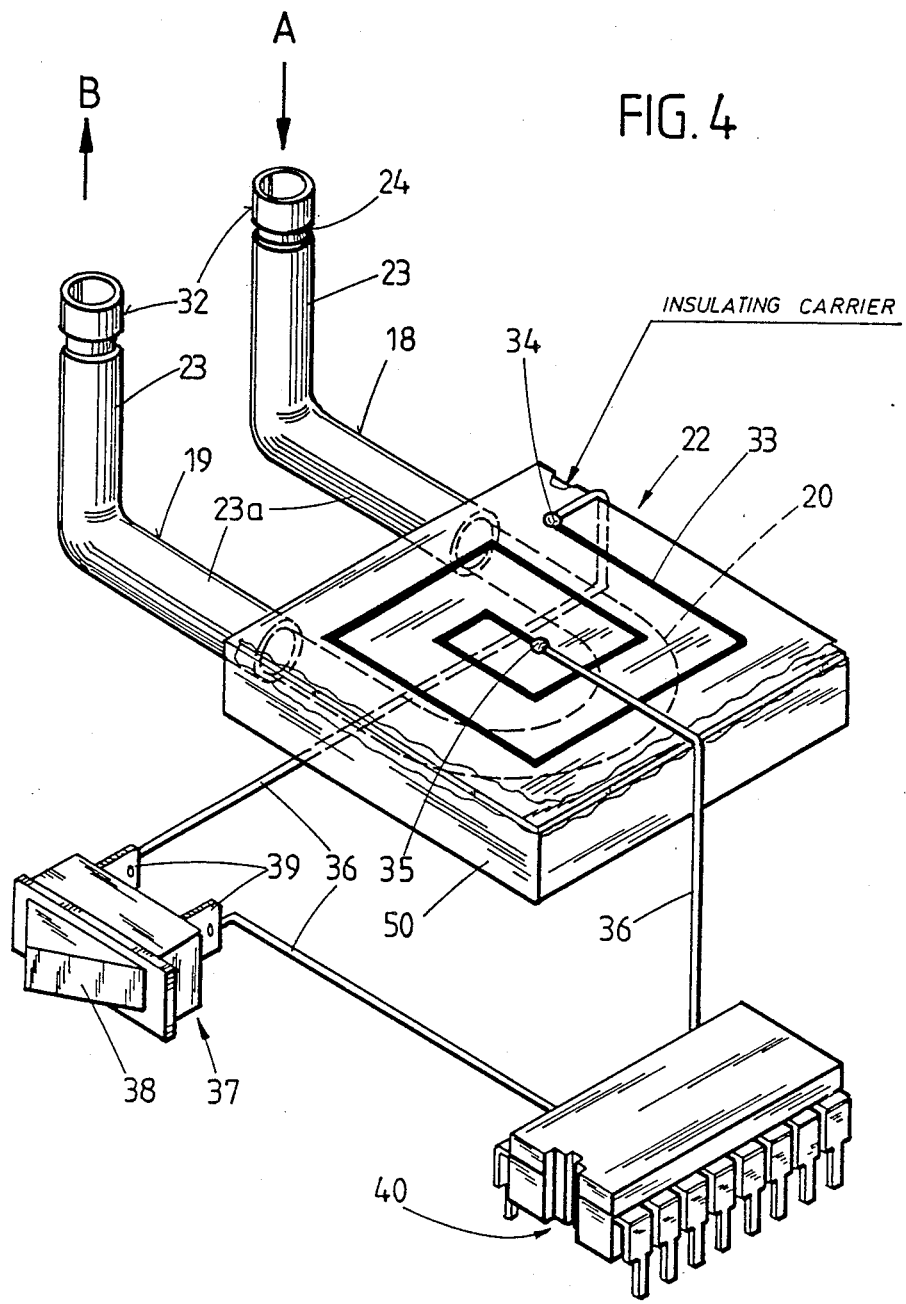
FIG. 4 is a perspective view of modified heating means which can be utilized in the improved machine.

Referring first to FIG. 1, there is shown an electric coffee making machine 10 which embodies one form of the present invention. The drawing shows only those parts of the machine which are necessary for full understanding of the invention. For example, the drawing does not show the means for connecting the machine with a source of electrical energy, electrical conductors in the housing 11 of the machine, and the control and/or regulating elements which are connected to each other by such conductors. All such parts which are not specifically shown but are necessary in order to render the machine fully operative can be similar, analogous or identical to corresponding parts of heretofore known machines, for example, the aforementioned "Euro/Brew/Aroma" and "Euro/Brew/Signal" Coffee Makers Nos. 154 and 152 of the assignee of the present application.

The substantially L-shaped housing 11 of the coffee making machine 10 is made of an electrically insulating material. Its relatively long horizontal leg or base 12 is hollow and serves to confine an electric heating device 22 which is constructed and assembled with other parts of the machine 10 in accordance with one embodiment of the present invention. The underside of the leg 12 can be provided with suitable pads which come in direct contact with the top of a table, with the top of a counter or with another suitable supporting structure when the machine 10 is in use.

The relatively short vertical portion or leg 14 of the L-shaped housing 11 carries a detachable or permanently mounted source of liquid in the form of an upright tank 13 which can be refilled in response to pivoting or detachment of a top wall or lid 26. The top wall 26 can be secured (e.g., by a rudimentary hinge) to a portion of the housing 11 or to the top portion of the tank 13. When the lid 26 is lifted or detached from the housing 11, the machine 10 can be moved beneath a water tap so as to replenish the supply of water in the tank 13.

The housing 11 of the machine 10 further carries a filter holder 25 which constitutes the main component part of a receptacle for a flavoring agent, normally comminuted coffee beans, which is to be contacted by hot water in order to produce a hot beverage which can be dispensed into a suitable collecting vessel 28 (e.g., a coffee pot made of light-transmitting plastic material) by way of a tubular extension 27 of the filter holder 25. The latter can receive a bag which is normally made of filter paper and can confine a selected quantity of comminuted coffee beans. The top 25a of the filter holder 25 can be pivoted in a horizontal plane by way of a handle 25b so as to afford access to or to confine the bag of filter paper in the space above the extension 27. Such filter holders with pivotable tops are well known in the art of coffee making machines.

The receptacle for flavoring agent and hot water further comprises a riser 17 which is installed in the housing 11 and serves to convey heated water from the heating device 22 to a level above the supply of flavoring agent in the filter holder 25 when the machine 10 is in use. The tubular lower part 15 of the riser 17 constitutes an upright inlet of the receptacle including the filter holder 25 and the riser 17, and such inlet can be said to constitute a coupling portion which must be sealingly connected with a complementary coupling portion 23 of an outlet 19 forming part of an elongated conduit 20. The inlet 18 of this conduit has a tubular coupling portion 23 which is sealingly connected with the tubular outlet 13a of the tank 13, such outlet 13a constituting a further coupling portion which is complementary to the coupling portion 23 of the inlet 18 of conduit 20.

The extension 27 can constitute an integral part of the filter holder 25 and is disposed above a removable cover 30 of the vessel 28. The latter has a suitable handle 29 and can rest on a warming plate 31 on top of the base or leg 12 of the housing 11, i.e., above the electric heating device 22 whose operation can be selected with a view to ensure that the supply of hot coffee in the vessel 28 can be maintained at a requisite temperature after the brewing operation is completed. The cover 30 is provided with a central opening which registers with the outlet of the extension 27 so that the vessel 28 can receive hot beverage when the vessel 28 is moved to a predetermined position relative to the warming plate 31. The arrangement may be such that the outlet in the extension 27 is automatically sealed by the cover 30 when the vessel 28 is removed from the warming plate 31. This prevents the hot beverage from dripping onto the warming plate 31. The just described feature of using the cover of a coffee pot or an analogous vessel as a means for automatically exposing or sealing the outlet of a receptacle wherein a heated liquid is caused or permitted to contact a flavoring agent is well known from the art of coffee making and like machines.

The details of the electric heating device 22 are shown in FIGS. 2 and 3. This device includes one or more electric heating elements 21 which are outwardly adjacent the preferably U-shaped main or central portion of the conduit 20 between the inlet 18 and outlet 19. The inlet 18 is disposed in a vertical plane which is parallel to the vertical plane of the outlet 19. The inlet 18 comprises the aforementioned tubular coupling portion 23 and an additional tubular portion 23a which is horizontal when the heating device 22 is installed in the base 12 of the housing 11 and the machine 10 is held in an optimum position for the brewing of coffee. The coupling portion 23 of the inlet 18 is vertical, the same as the coupling portion 23 of the outlet 19 which latter also comprises a horizontal tubular portion 23a. The coupling portions 23 are provided with circumferentially complete external annular grooves 24 which are closely or immediately adjacent the tops 32 of the respective coupling portions 23 and serve for reception of O-rings 16 or analogous sealing elements. The shoulders 24a flanking the grooves 24 can be said to constitute a means for maintaining the sealing elements 16 in predetermined positions relative to the respective coupling portions 23. The casing or carrier 22a of the heating device 22 constitutes a means for maintaining the inlet 18 and the outlet 19 of the conduit 20 in predetermined positions relative to each other so as to facilitate automatic assembly of the heating device 22 with the tank 13 and riser 17.

When the machine 10 is properly assembled and is in use, the heating element or elements 21 of the heating device 22 are connected with a source of electrical energy and cold water flows from the outlet 3a of the tank 13 into the conduit 20 to be heated in the casing 22a prior to entering the riser 17 wherein it flows to a level above the supply of comminuted coffee beans in the filter holder 25 before contacting the bag of filter paper. The resulting hot beverage flows through the outlet of the extension 27 and into the vessel 28 on the warming plate 31 of the base 12. The upper end portion of the riser 17 communicates with a horizontal pipe (reference may be had to the aforementioned copending patent application Ser. No. 207,764 of Erich Hoffmann) which conveys hot water to a level above the filter holder 25 and has an open end above the bag of filter paper.

The housing 11 of the machine 10 carries an electric on-off switch 41 (e.g., a switch with a rotary actuator) which must be manipulated by the operator of the machine to connect the heating element or elements 21 with, or to disconnect such heating elements from, a source of electrical energy. The reference character 42 denotes in FIG. 1 a signal lamp which is disposed at a level below the switch 41 and serves as a means for indicating whether or not the electric heating element or elements 21 are connected with an energy source.

For the sake of simplicity and in order to reduce the cost of the electric heating device 22, the inlet 18 of the conduit 20 is preferably identical with the outlet 19. The conduit 20 can be made of a metallic material which is a good conductor of heat, and the length of its U-shaped portion in the interior of the casing or carrier 22a suffices to ensure that the temperature of water is raised to a desired level. The tubular portions 23a of the inlet 18 and outlet 19 are horizontal, and the coupling portions 23 are vertical. The outlet or coupling portion 13a of the tank 13 is vertical, the same as the inlet or coupling portion 15 of the riser 17 which forms part of the receptacle for hot water and flavoring agent.

FIG. 3 shows that the coupling portion 23 of the outlet 19 of the conduit 20 extends into the inlet 15 (i.e., into the lower end portion of the riser 17), that the respective sealing element 16 is received in the external groove 24 of the coupling portion 23, and that this sealing element is maintained in deformed condition by the internal surface of the inlet 15. The same holds true for the direct connection between the coupling element 23 of the inlet 18 of the pipe 20 and the outlet 13a of the tank 13.

In accordance with a modification which is shown in FIG. 3a, the coupling portion 23 of the outlet 19 of the conduit 20 receives the inlet 15 of the receptacle including the riser 17, and the groove 24 is provided in the external surface of the inlet 15 so that the sealing element 16 in this groove is deformed by the internal surface of the coupling portion 23. The same can apply for the direct connection between the inlet 18 and the outlet 13a, i.e, the outlet 13a can extend into the inlet 18. The shoulders 15a bounding the groove 24 in the external surface of the inlet 15 which is shown in FIG. 3a constitute a means for maintaining the respective sealing element 16 in an optimum position relative to the inlet 15 during assembly of the riser 17 with the coupling portion 23 of the outlet 19 of FIG. 3a.

An important advantage of the improved machine 10 is that the establishment of direct liquid-conveying connections between the conduit 20 on the one hand and the tank 13 and riser 17 on the other hand can be carried out in a fully automatic way, e.g., in a production line. The housing 11 serves as a means for maintaining the properly installed outlet 13a of the tank 13 and the properly installed inlet 15 of the riser 17 in predetermined positions and in a predetermined orientation relative to each other so as to ensure that introduction of the inlet 18 into the outlet 13a (or vice versa) can take place simultaneously with introduction of the outlet 19 into the inlet 15 (or vice versa). The grooves 24 maintain the respective sealing elements 16 in optimum positions for deformation by the surrounding coupling portions so that such sealing elements positively prevent leakage of cold water in the region of direct connection between the tank 13 and the conduit 20, as well as in the region of direct connection between the conduit 20 and the riser 17.

Another important advantage of the improved machine is that it is not necessary to produce and employ discrete coupling devices which are needed in conventional machines to establish liquid-conveying connections between the end portions of the conduit (which forms part of the electric heating device) on the one hand, and the tank and filter holder on the other hand. All that is necessary is to employ a one-piece conduit 20 with suitably configurated and oriented inlet and outlet means so as to permit the establishment of direct connections with the tank and with the riser.

The heating element or elements 21 of the heating device 22 are preferably in large-area surface-to-surface contact with the U-shaped portion of the conduit 20 between the inlet 18 and the outlet 19 in order to ensure that a relatively small heating device will be capable of adequately heating the stream of water which flows from the tank 13 toward and into the riser 17. The warming plate 31 can be permanently or separably affixed to the top portion of the carrier 22a.

FIG. 4 shows a modified heating device 22 wherein the heating element or elements 21 of FIG. 2 are replaced with one or more thick film conductors 33 on the upper side of a block-shaped carrier 50. The U-shaped portion of the conduit 20 is confined in the carrier 50 and is thus heated by the thick film conductor 33. The latter can be applied in a well known manner in the form of a paste which is caused or permitted to set on the carrier 50 and is electrically connected with a standard on-off switch 37 and with current regulating means including one or more relays 40. A first conductor 36 is provided to connect a junction 34 with one of two terminals 39 of the switch 37 (the latter has a pivotable actuator 38), and a second terminal 39 of the switch 37 is connected with the relay 40 by a second conductor 36. An additional conductor 36 connects the relay 40 with another junction 35 of the thick film conductor 33. The conductors 36 can be soldered to the terminals 39 and to the relay 40.

The construction of the inlet 18 and outlet 19 of the conduit 20 is or can be the same as shown in FIG. 2, i.e., the tubular portions 23a are horizontal and the coupling portions 23 are vertical, and the external surfaces of the coupling portions 23 are provided with circumferentially complete annular grooves 24 which are adjacent the tops 32 of the respective coupling portions 23. The sealing elements (such as O-rings), which are received in the grooves 24 before the inlet 18 is directly connected to the outlet of the water tank and before the outlet 19 is directly connected to the inlet of a riser, are not shown in FIG. 4. The direction in which cold water enters the inlet 19 of the pipe 20 is indicated by an arrow A, and the direction in which heated water leaves the outlet 19 of the conduit 20 is indicated by an arrow B.

The carrier 50 can be made of a metallic material, such as aluminum. The relay 40 can be of the type known as CMOS which is manufactured and sold by Motorola.

The heating device 22 of FIG. 4 is a PTC heater with a power of, for example, 500 watts. The relay 40 can be designed in such a way that the thick film conductor 33 causes the conduit 20 to heat water for an interval of eight minutes before the power is reduced to 30 watts. The 30-watt output suffices to maintain the beverage in the vessel 28 on the warming plate 31 (not shown in FIG. 4) at a desired temperature. The relay 40 automatically and fully disconnects the conductor 33 from the energy source after elapse of a second interval of time which can be selected by appropriate setting of the relay.

The machine which embodies the heating device 22 of FIG. 4 exhibits all of the aforediscussed advantages of the machine 10 of FIGS. 1 to 3. Thus, there is no need to provide costly, complex and expensive discrete coupling devices which are needed in conventional machines, and the establishment of a direct connection between the inlet 18 of the conduit 20 of FIG. 4 can take place simultaneously with the establishment of a direct connection between the outlet 19 of such conduit and the riser. The entire heating device 22 of FIG. 2 or 4 can constitute a prefabricated unit which can be assembled with a water tank and with a riser in a production line at a fraction of the cost of assembling conventional coffee making and like machines. As mentioned above, the warming plate 31 can constitute a separable or permanently installed part of the heating device 22. The grooves 24 can be provided (in the conduit 20 or in the outlet 13a and inlet 15) during making of the conduit 20, tank 13 and riser 17 so that they can be furnished with inserted sealing elements 16 to make the heating device 22 ready for direct attachment to the tank 13 and riser 17. The sealing elements 16 can be made of rubber or any other suitable elastomeric material. The shoulders 15a or 24a flanking the grooves 24 (or analogous restraining means in the form of ridges, ribs or otherwise configurated projections) ensure that the sealing elements 16 remain in optimum positions during the making of direct connections between the conduit 20 on the one hand and the tank 13 and riser 17 on the other hand. The grooves 24 will be relatively wide if it is desired to establish a large-area contact between the deformed sealing elements 16 and the surrounding internal surfaces of the outlet 13a and inlet 15 (FIGS. 1, 2, 3 and 4) or the surrounding internal surfaces of the coupling portions 32 (FIG. 3a). It often suffices to form relatively narrow grooves 24 for reception of relatively small and inexpensive sealing elements 16 in the form of O-rings or the like.

An advantage of the feature that the coupling portions 23 extend substantially at right angles to the respective tubular portions 23a of the inlet 18 and outlet 19 of the conduit 20 is that this facilitates assembly of the heating device 22 with the tank 13 and riser 17 of an otherwise conventional machine wherein the outlet of the tank is normally vertical, the same as the inlet of the riser. As mentioned above, the U-shaped portion of the conduit 20 is normally located in a horizontal plane so that, if the additional tubular portions 23a of the inlet 18 and outlet 19 of such conduit are horizontal, the vertical coupling portions 23 can be automatically inserted into (or can automatically receive) the outlet 13a of the tank 13 and the inlet 15 of the riser 17. Of course, if the U-shaped portion of the conduit 20 is not located in a horizontal plane and/or if the outlet 13a and/or the inlet 15 is not vertical, the angle between the coupling portions 23 and additional tubular portions 23a of the inlet 18 and/or outlet 19 of the conduit 20 will be altered accordingly.

The improved machine is susceptible of many additional modifications. For example, the carrier 50 of FIG. 4 can support two or more thick film conductors 33 which are applied to a single side or to different sides of the carrier. Irrespective of the number of thick film conductors and of the number of surfaces on the carrier 50 which are provided with one or more thick film conductors, the heating device 22 of FIG. 4 can dispense with a heating tube or pipe which surrounds the U-shaped portion of the conduit 20 between the inlet 18 and the outlet 19.

Direct connections between the conduit 20 on the one hand and the tank 13 and riser 17 on the other hand can employ more complex and/or larger numbers of sealing elements. Still further, and though it is preferred to make the inlet 18 of the conduit 20 identical with the outlet 19, such identity is not critical since it contributes primarily to lower cost of the heating device but does not affect its mode of operation. For example, the arrangement may be such that the inlet 18 is receivable in the outlet 13a while the outlet 19 receives the inlet 15, or vice versa. Furthermore, the length of the inlet 18 can exceed the length of the outlet 19 (or vice versa) if this is necessary in order to ensure that the inlet 18 can be properly coupled with the outlet 13a and/or that the outlet 19 can be properly coupled with the inlet 15. This might be necessary if the machine 10 is to employ a standard water tank 13 and a standard riser 17 so that the length of the inlet 18 and outlet 19 of the conduit 20 must conform to the dimensions of such standard components.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Machine for making hot beverages by contacting a heated liquid with a flavoring agent, comprising a source of liquid having an outlet; a receptacle for flavoring agent, said receptacle having an inlet; and means for heating the liquid including a one-piece conduit having an inlet sealingly connected to and communicating directly with the outlet of said source and an outlet sealingly connected to and communicating directly with the inlet of said receptacle.

2. The machine of claim 1, wherein said receptacle includes a riser having a lower portion which constitutes or includes the inlet of said receptacle.

3. The machine of claim 1, wherein inlet and the outlet of said conduit respectively include first and second tubular coupling portions, the outlet of said source including a third tubular coupling portion and the inlet of said receptacle including a fourth coupling portion, one of said first and third coupling portions being directly telescoped into the other of said first and third coupling portions with a first sealing element disposed between the first and third coupling portions, and one of said second and fourth coupling portions being directly telescoped into the other of said second and fourth coupling portions with a second sealing element disposed between said second and fourth coupling portions.

4. The machine of claim 3, wherein one of said first and third coupling portions has a groove for said first sealing element and one of said second and fourth coupling portions has a groove for said second sealing element.

5. The machine of claim 4, wherein at least one of said grooves is a circumferentially complete groove.

6. The machine of claim 3, wherein said first and second coupling portions are respectively telescoped into said third and fourth coupling portions.

7. The machine of claim 3, wherein the inlet of said conduit has an additional tubular portion which is inclined relative to said first coupling portion and the outlet of said conduit has an additional tubular portion which is inclined relative to said second coupling portion.

8. The machine of claim 7, wherein at least one of said first and second coupling portions and the respective additional portion make an angle of substantially 90°.

9. The machine of claim 1, wherein said heating means further comprises an insulating carrier immediately or closely adjacent said conduit intermediate the inlet and the outlet of said conduit, at least one thick film conductor on said carrier, electric switch means in circuit with said conductor, and current regulating means in circuit with said conductor.

10. The machine of claim 9, wherein said regulating means includes a relay.

11. The machine of claim 1, wherein said heating means further comprises a support for said conduit, said support including means for maintaining the inlet and the outlet of said conduit at a predetermined distance from and in a predetermined orientation relative to each other.

12. The machine of claim 11, wherein the inlet and the outlet of said conduit are at least substantially parallel to each other.

13. The machine of claim 11, further comprising a housing including means for maintaining the outlet of said source and the inlet of said receptacle at a predetermined distance from and in a predetermined orientation relative to each other so that the inlet of said conduit can be inserted into or can receive the outlet of said source at the time the outlet of said conduit is inserted into or receives the inlet of said receptacle.

14. The machine of claim 1, further comprising first sealing element which surrounds the outlet of said source.

15. The machine of claim 1, further comprising a first sealing element which surrounds the inlet of said conduit.

16. The machine of claim 1, further comprising a second sealing element which surrounds the outlet of said conduit.

17. The machine of claim 1, further comprising a second sealing element which surrounds the inlet of said receptacle.

18. The machine of claim 1, further comprising a sealing element which surrounds the outlet of said source, and means for maintaining said sealing element in a predetermined position relative to the outlet of said source.

19. The machine of claim 1, further comprising a sealing element which surrounds the of said receptacle, and means for maintaining said sealing element in a predetermined position relative to the inlet of said receptacle.

20. A method of conveying water or another liquid from a source to a receptacle in a machine for making hot beverages wherein the liquid is caused to contact a flavoring agent in the receptacle, comprising the steps of establishing a path for the flow of liquid from the source to the receptacle including directly sealingly connecting one end of an elongated one-piece conduit with the source and directly sealingly connecting the other end of the conduit with the receptacle; and electrically heating the liquid in the conduit between the one and the other end of the conduit.

* * * * *